United States Patent [19]

Adkisson

[11] Patent Number: 4,558,331
[45] Date of Patent: Dec. 10, 1985

[54] HEATING RESISTOR SHAPE IN A THERMAL PRINTHEAD

[75] Inventor: William M. Adkisson, Englewood, Colo.

[73] Assignee: Honeywell Inc., Minneapolis, Minn.

[21] Appl. No.: 607,986

[22] Filed: May 7, 1984

[51] Int. Cl.[4] .......................................... G01D 15/10
[52] U.S. Cl. ................................ 346/76 PH; 219/543; 219/216; 338/308
[58] Field of Search ............... 400/120; 219/543, 216, 219/216 PH; 346/76 PH:139 R, 86 R; 338/307, 308, 333

[56] References Cited

U.S. PATENT DOCUMENTS

| | | |
|---|---|---|
| 2,787,543 | 4/1957 | Murray et al. . |
| 3,206,599 | 9/1965 | Gold . |
| 3,291,600 | 12/1966 | Nicoll . |
| 3,354,817 | 11/1967 | Sakurai et al. . |
| 3,362,380 | 1/1968 | Anderson et al. . |
| 3,445,310 | 5/1969 | Danielson et al. . |
| 3,478,191 | 11/1969 | Johnson et al. . |
| 3,676,121 | 7/1972 | Jones et al. . |
| 3,792,266 | 2/1974 | Gundlach . |
| 3,833,441 | 9/1974 | Heiart . |
| 3,869,612 | 3/1975 | Lenhard . |
| 3,902,062 | 8/1975 | Eichorn . |
| 3,904,875 | 9/1975 | Rees et al. . |
| 3,908,125 | 9/1975 | Eichorn . |
| 3,909,613 | 9/1975 | Critchlow . |
| 3,941,596 | 3/1976 | Heiart . |
| 3,946,230 | 3/1976 | Sullivan, Jr. et al. . |
| 3,975,195 | 8/1976 | Goffe . |
| 4,013,462 | 3/1977 | Goffe . |
| 4,092,650 | 5/1978 | Hinz . |
| 4,105,892 | 8/1978 | Tashiro . |
| 4,113,391 | 9/1978 | Minowa . |
| 4,123,309 | 10/1978 | Perrington et al. . |
| 4,140,907 | 2/1979 | Oba . |
| 4,204,107 | 5/1980 | Ohkubo et al. . |
| 4,206,541 | 6/1980 | Marciniee . |
| 4,215,193 | 7/1980 | Manger et al. . |
| 4,241,156 | 12/1980 | Haas . |
| 4,252,890 | 2/1981 | Haas . |
| 4,292,394 | 9/1981 | Chu . |
| 4,300,142 | 11/1981 | Kos .............................. 346/76 PH |

Primary Examiner—E. A. Goldberg
Assistant Examiner—A. Evans
Attorney, Agent, or Firm—Charles J. Ungemach

[57] ABSTRACT

A thermal recording head wherein the resistive heater portion thereof is shaped in an "hour glass" configuration in order to provide accurate control over the size and configuration of the melt produced thereby.

15 Claims, 2 Drawing Figures

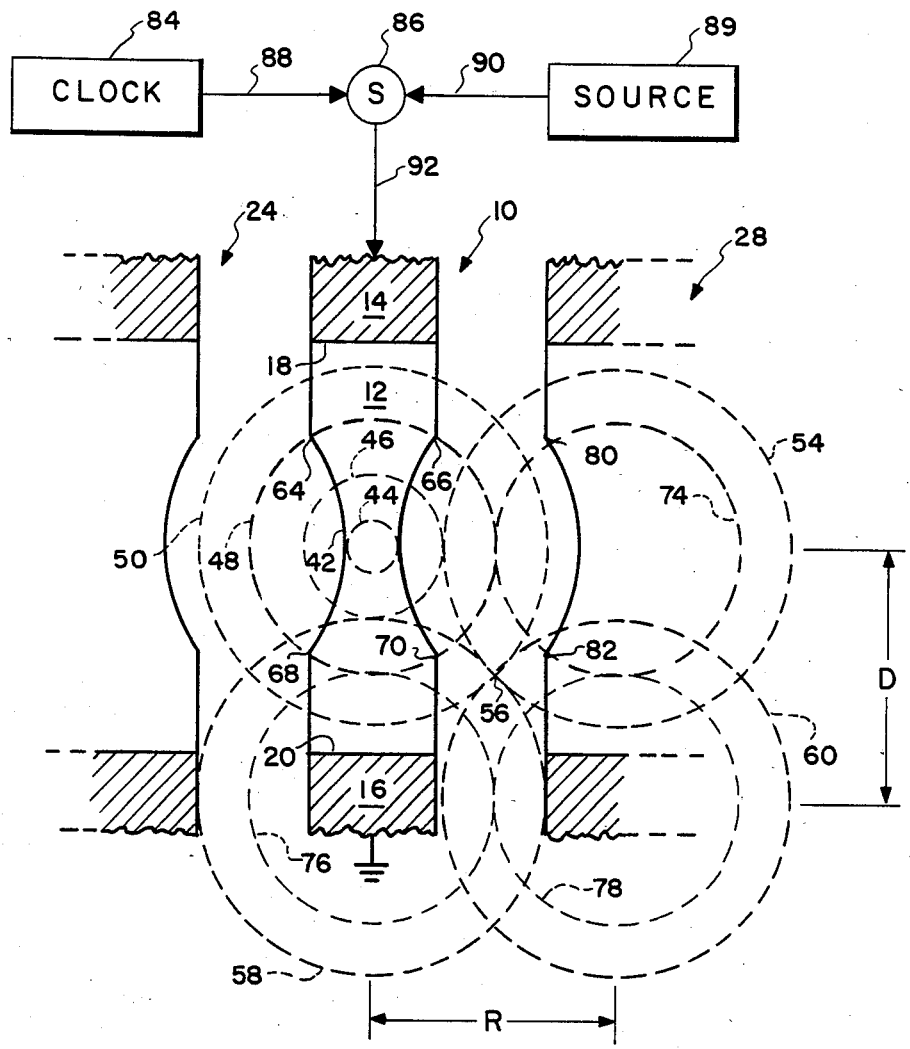
F I G. 1
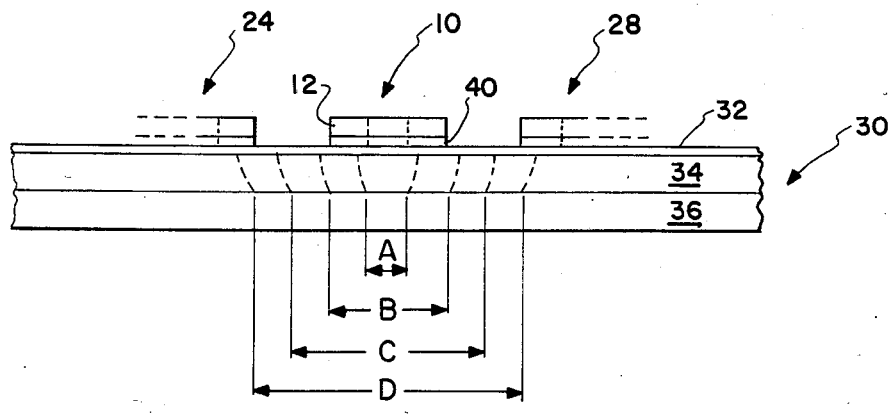
F I G. 2

HEATING RESISTOR SHAPE IN A THERMAL PRINTHEAD

BACKGROUND OF THE INVENTION

In the art of thermal recording, it is necessary to provide a "head" composed generally of a resistive element which heats up to a predetermined temperature upon the application of electrical energy. The temperature is such as to cause a mark or dot to appear on a thermally sensitive material usually by melting a portion of the material. Special paper is usually employed which may be one of several types. For example, a paper manufactured by the Jujo Paper Company, Ltd., and identified by the number TP50KH-H5 employs a thermoplastic that has dye components that are colorless until heated but, upon the application of heat, turn to a contrasting color such as black. Alternatively, a paper having a thermoplastic surface may be melted and then moved to a position where toner is applied as is disclosed in D. F. Anderson et al. U.S. Pat. No. 3,362,380 which issued Jan. 9, 1968. Another type of paper referred to as a "dye transfer" paper, is manufactured by the General Company, Ltd. and is identified by the number CTTC-F-6M. This paper involves the use of a waxy, colored material that melts upon the application of heat and the melted areas attach themselves to leave marks on a receiving paper placed adjacent to the dye transfer paper. After the deposits have been made onto the receiving paper, it is separated from the dye transfer paper. This is less messy than the application of toners and has the advantage over interior dye component paper of allowing colored reproductions since, after the receiving paper has been removed from a dye transfer paper of a first color, for example yellow, it may be placed against a second dye transfer sheet of a different color, for example magenta, and then yet against a third dye transfer sheet of, for example cyan and the process repeated in each step so as to produce the full range of hues desired.

One type of thermal printing apparatus employs a plurality of individual thermal heaters placed side by side across the width of the paper. Examples of this may be found in a patent to Yuji Oba U.S. Pat. No. 4,140,907 which issued Feb. 20, 1979 and in the Hans-Dieter Hinz U.S. Pat. No. 4,092,650 which issued May 30, 1978. In such apparatus, a plurality of dots or marks are printed across the width of the paper. The paper is then advanced and further dots or marks are printed. This process is repeated until a desired image is produced. In order to get various grey scale values, it is desirable that the dots cover various areas on the paper. Very small dots would leave the paper almost white whereas very large dots could be made to overlap and produce a totally black surface on the paper. Dots of various sizes in between these extremes would produce various grey scale values. One problem that has arisen in the apparatus of the prior art is that of the extreme difficulty in controlling the size of the dots not only accurately but evenly. Dots which are of the wrong size or which are shaped unevenly or oddly will produce grey scale values that are not desired. Attempts have been made to control the size of the dot accurately by shaping the conductors that lead to the resistive thermal printing head as is shown in the Steven Kos U.S. Pat. No. 4,300,142 which issued Nov. 10, 1981. The difficulty encountered with the Kos structure lies in the fact that the conductors are of a material which conducts heat away from the area being melted much faster than the resistive portion of the head. Thus as the melt begins to grow, the heat is conducted away from the paper by the conductors in one direction while it is not so conducted in the other with the result that the dots or marks that are left by the thermal head are oblong or otherwise oddly shaped and produce grey scales of undesired values.

SUMMARY OF THE INVENTION

I have discovered that by properly shaping the thermal head resistive material and by moving the conductive leads attached thereto back away from the melt area, I can produce a dot having as many as 32 controlled areas with each dot being evenly shaped and at the same time utilizing a minimum of power consumption so as to reduce overall heat and prolong head life. More particularly, in the preferred embodiment of my invention, I utilize a thermal head resistor material which is shaped like an "hour glass" and I move the conductive leads attached thereto back away from the narrow portion thereof to a distance greater than the maximum size dot to be formed. As voltage is applied, the narrow portion of the hour glass reaches a higher temperature and is thus first able to produce a melt area of size, that is approximately the size of the narrow portion itself. Thicker portions of the hour glass structure will reach lower temperatures and will thus melt the material at a later time. During the time that the electrical energy is applied to the head, the melt wave grows outwardly from the first melted narrow portion with the result that a dot of controlled size and which is substantially circular in all sizes is generated. When the electrical energy is turned off, the dot stops growing and with proper timing, one of the desired 32 dot sizes will be produced.

BRIEF DESCRIPTION OF THE DRAWINGS

FIG. 1 is a top view of one thermal recording head constructed according to the present invention and partial top views of adjacent recording heads also showing several melt sizes; and FIG. 2 is a side view of the thermal recording heads of FIG. 1 and also showing one form of paper that may be used.

DETAILED DESCRIPTION OF THE PREFERRED EMBODIMENT

In FIGS. 1 and 2 a thermal recording head 10 is shown comprising an "hour glass" shaped resistor 12 and a pair of conductors 14 and 16 connected to the ends of resistor 12 at lines 18 and 20 respectively. Head 10 is one of a plurality of similar heads mounted side by side as is seen by partial heads 24 and 28 on either side of head 10. The plurality of heads extend across the width of a sensitive paper shown generally in FIG. 2 by reference numeral 30. For purposes of explanation herein, it will be assumed that a dye transfer paper is being employed although it should be understood that the invention is equally applicable to other types of thermally responsive papers. The dye transfer paper 30 comprises a thin coating of heat resistive transparent material 32, such as Mylar, on top of a layer of meltable material 34, such as wax, which contains a dye or color that will be visible on a receiving sheet 36 which is placed below the dye transfer layer 34. In most applications the dye will be of a black color when the backing sheet 36 is white. It should be understood that other color combinations can be used and, in fact, several applications of different colored dye transfer papers may be employed so as to produce a full color image on the receiving material 36. The head 10 and the other heads have a protective layer of material 40, shown in FIG. 2, which is in contact with the layer 32 of the paper assembly 30. The protective layer 40 helps protect the head 10 from wear when the paper moves (upwards or downwards in FIG. 1 and into or out of the plane of the paper in FIG. 2).

When voltage is applied from the conductor 14 through the resistor 12 to the grounded conductor 16, the heat generated will pass through the layer 32 in FIG. 2 and will cause the layer 34 to melt as between pairs of dashed lines seen extending across the layer 34 and leave a spot or mark on the receiving material 36. As best seen in FIG. 1, the "hour glass" shape of the resistor 12 allows close control of the size of the melt portion produced in the layer 34. As current is applied, the narrowest portion 42 of resistor 12 will heat up to the highest temperature since its resistance is greatest. This will first produce a melt in an area defined by dashed line 44. Actually, the narrow region quickly reaches the thermoplactic's "upper glass temperature" after which the temperature rise is slowed because of psuedo latent heat of fusion which must be supplied to keep increasing the melt size. The first area is shown in FIG. 2 by the diameter "A" of the circle on the lower surface of layer 34, it being understood that the area of the melt on the upper surface of layer 34 will be slightly larger than that on the lower due to the temperature gradient across the layer 34. The areas of resistor 12 progressively more remote from the narrow portion 42 will heat to the thermoplastic's "upper glass temperature" at progressively later times since their resistances are lower. Accordingly, the melting of areas away from that of diameter A FIG. 2, shown by diameters B, C, and D will take progressively longer periods of time.

In FIG. 1, as the time period during which the current through conductors 14 and 16 is applied to resistor 12 increases, the portion of resistor 12 which causes a melt in the layer 34 moves away from the narrow portion 42 towards the lines 18 and 20 respectively and the melt wave shown by dash lines 44 moves out to positions shown by dash lines 46, 48, and 50 for example. These areas correspond to those represented in FIG. 2 by the diameters B, C, and D respectively on the lower surface of layer 34. While only four areas have been shown in the figures for simplicity it is to be understood that with the present invention it is possible to control the "on time" of the voltage so as to produce many more well defined and discrete melt areas. In actual practice it is intended that the individual thermal heads will, by virtue of proper timing, be able to produce 32 such distinct melt areas and, as a result, will be able to produce 32 grey scale shades. Furthermore, using the colors yellow, magenta, and cyan, a color palet of over 32,000 colors is produced of which 186 are distinct saturated colors.

In FIG. 1 the smallest area shown by dash line 44 is of size that depends upon the size of the narrowest section of the hour glass and the largest area shown by dash line 50 is that area which will just touch an equal area made by head 28 and shown as dash line 54 at a point 56. Point 56 is the closure point where the largest melt areas from the various heads will meet so that the paper will be uniformly black in that area. In FIG. 1 an area identified as dash line 58 and an area identified as dash line 60 representing respectively the largest melt areas made by heads 10 and 28 at the previous position of the paper are both seen to also meet at point 56. Thus, the entire surface of the paper in the area of the four large melt circles 50, 54, 58, and 60 will be a uniform black. It is noticed that the lines 18 and 20 where the conductors 14 and 16 meet the resistive portion 12 lie beyond the largest melt area thus assuring that the heat pattern will not be disturbed by the conduction of heat away from the area by the conductors 14 and 16. It should also be noted that one of the middle sized areas identified by dash line 48 is shown passing through the junction points 64, 66, 68, and 70 where the vertical or straight portions of resistor 12 meet the inwardly curved portions thereof. It is at this location that the larger of the middle size circles 48 of FIG. 1 is just tangent to its neighbors shown by dash lines 74 and 76 respectively. The tangential situation of dash lined circles 48, 74, 76, and a circle shown by dash line 78 is important since, up to this point the melt areas do not overlap. Thus, the growing of the circles by equal incremental increases in area (thus producing equal incremental increases in grey scale values) can be accomplished with equal incremental increases of "on time" for the voltage applied to resistor 12. Beyond the tangential situation, the melt areas overlap so that equal incremental changes in area of the circles will not produce equal incremental grey scale values. Accordingly, beyond that point, the curved part of resistor 12 may stop and to obtain equal incremental changes in grey scale values the "on time" will have to be properly characterized in unequal steps. The curve between points 64 and 68 and between points 66 and 70 may take many forms, although preferably a conic section is employed. The curve shown in FIG. 1 is circular for ease in drafting. In another preferred embodiment, the curve between points 66 and 70 is an elipse of a size which intersects points 66 and 70, is tangent to the smallest circle 44 and also passes through similar points 80 and 82 on the next head 28 and tangent to the smallest circle generated by head 28 (not shown). With this configuration the "on time" to produce 32 equal increments of grey scale values will change as follows: If zero is considered the smallest circle and produces a grey scale of white then the smallest dot (the circle of dash line 44) produces a grey scale 1/31 of the density between white and black and if that circle is produced by a "dwell time" above upper glass temperature of T, then the next grey scale value 2/31 will be produced by a "dwell time" of 2T. Likewise 3/31 is produced by a "dwell time" of 3T and, this continues up to the tangent situation above described which produces a grey scale value of 24/31 in a "dwell time" of 24T. After a melt area the size of that shown by dash line 48 has been reached at 24T, the next equal increment of grey scale will not be produced by an equal increment of time. More particularly, the 25th melt area will be produced by a "dwell time" of 25.12345T, the 26th by a "dwell time" of 26.57000T, the 27th by a "dwell time" of 28.33263T, the 28th by a "dwell time" of 30.52540T, 29th by a "dwell time" of 33.35688T, the 30th by an "dwell time" of 37.40166T, and 31st by a "dwell time" of 48.69462T.

In the preferred embodiment the growth of 31 areas from that shown by dash line 44 to that shown by dash line 50 is accomplished by a timing mechanism shown in FIG. 1 as a box 84 identified as "clock" connected to a switch 86, labelled "S" by a connection shown as arrow 88. Switch 86 is also connected to an energy supply 89 labelled "source" by a connection shown as arrow 90. Current from source 88 passes through switch 86 when it is "on" and by a connection shown as arrow 92 produces the current flow to the resistor 12 by an amount of time determined by clock 84 necessary to produce the various sized melt areas. After the desired time, clock 84 opens switch 86 to terminate the melt. Thus, when the apparatus is configured as described above, clock 84 will produce equal incremental time periods from 1T up to 24T and will thereafter be characterized to produce the various longer time periods up to 48.69462T where the last or totally black grey scale value occurs.

During the time that the current is applied to the heaters, the paper is in a stopped condition. After the desired melt area has been created, the paper may then be moved the distance shown in FIG. 1 as D, representing the distance between the centers of the circles 48 and 76 when these circles are tangent. Likewise, the distance between two adjacent heater elements such as 10 and 28 is shown in FIG. 1 to be "R" representing the distance between the centers of circles 48 and 74 when they are just tangent. In actual practice, the heads are spaced so as to produce about 300 dots per inch with the largest melt areas shown by dash lines 50, 54, 58, and 60 able to meet at point 56 and thus create a maximum grey scale coverage. Of course, more overlapping of areas than that shown by the largest circles of FIG. 1 could be done but it would take more time and waste power.

A full page image melt is expected to take less than forty seconds. As previously mentioned, after the surface of the paper receiving portion 36 has received a transfer of coloration from the dye transfer portion 34 and cooled, then the backing portion 36 may be separated from the dye transfer portion 34 and outputted or, may be used with another dye transfer sheet so as to provide a second application of color followed by a third as previously described for obtaining of a full color image.

It should be noted that the "hour glass" configuration allows very rapid heating up of the central area so that, for the most part, the speed at which the paper may be moved through the apparatus is faster than that obtainable in the prior art devices attempting grey scale. If desired, apparatus for lifting the thermal head away from the paper during the period in which the paper is moving may be employed so as to further reduce the wear on the individual heads.

It is therefore seen that I have provided a thermal printing head that can control the size of a melt area to very exacting dimensions and that such melt area will be substantially uniform in configuration in all of its plurality of sizes. This has been accomplished using a minimum of power and with a greater speed than was obtainable in the prior art. Many obvious changes will occur to those skilled in the art such as the variation of shape of curvature in the hour glass portion, modification of the connection zone between the conductors and the resistor portions of the heads and, as described, many different kinds of thermally responsive paper may be employed without departing from the spirit or scope of the present invention. I therefore do not wish to be limited to the specific disclosures used in connection with the description of the preferred embodiment but intend only to be limited by the following claims.

I claim:

1. A thermal recording head for use in marking a thermally responsive recording medium proximate thereto, comprising:
    a heater member of resistive material;
    first and second electrical conductors connected at first and second locations, respectively, to said heater member to apply electrical energy thereto, said resistive material having a first cross-sectional area at a first position between the first and second locations and cross-sectional areas in other positions between the first and second locations that increase with remoteness from the first position so that when electrical energy is applied, the first position reaches a first temperature at a first time and progressively remote positions reach the first temperature at progressively later times.

2. Apparatus according to claim 1 wherein the first temperature at the first position first causes a mark on the thermally responsive recording medium of a first size, and as the time electrical energy is applied increases, the size of the mark increases to a second size.

3. Apparatus according to claim 2 wherein the first and second locations are remote enough from the first position that they do not overlap a mark of the second size.

4. Apparatus according to claim 2 including source means supplying electrical energy to the heater member and switch means terminating the supply at predetermined times to provide marks of various sizes between the first and second sizes.

5. Apparatus according to claim 4 including timing means connected to said switch means to time the period of supplying electrical energy.

6. Apparatus according to claim 2 wherein the marks are substantially circular dots.

7. Apparatus according to claim 6 wherein the thermally responsive medium moves a distance "D" after a first mark is made so that a second mark can be made and wherein a dot of the second size of the first mark is large enough to overlap a dot of the second size of the second mark.

8. Apparatus according to claim 1 wherein the resistive material is "hour glass" shaped, the first and second locations are at opposite thick portions thereof, and the first position is at the narrow part thereof.

9. A thermal recording head for use in making a thermally responsive recording medium comprising:
    a heater member of resistive material, said resistive material is generally "hour glass" shaped having a narrow portion and extending in a curved fashion in two opposite directions from the narrow portion to first and second thick portions;
    first and second electrical conductors connected respectively to the first and second thick portions at first and second locations respectively;
    energy supply means;
    switch means having an open and a closed condition and connected to said energy supply means;
    timing means connected to said switch means to control the open and closed conditions thereof, said first and second conductors connected to said energy supply means through said switch means so that when said switch means is in a closed condition, current flows through said resistive material for an "on time" whose duration is determined by said timing means, the narrow portion heating first to produce a dot of a first size on the recording medium and as the duration of "on time" increases progressively larger dots are produced by progressively thicker portions of the "hour glass" shape up to a dot of a second size.

10. Apparatus according to claim 9 wherein the first and second locations are remote enough from the narrow portion that a dot of the second size does not overlap the first and second conductors.

11. Apparatus for marking a thermally responsive recording medium which is moveable in a first direction, comprising:
a plurality of thermal recording heads mounted in side-by-side relationship to extend over the surface of the recording medium in a second direction transverse to the first direction, each recording head including a heater member formed from resistive material, said resistive material being "hour glass" shaped having a narrow part at a first position and a pair of oppositely spaced thick parts remote from the narrow parts and including a pair of electrical conductors connected to the thick parts at first and second locations respectively; and
supply means connected to each of the pairs of electrical conductors to produce, for a controlled "on time", a current in the resistive material of selected heads so that the narrow parts heat to produce marks of a first size on the recording medium at a first "on time" and progressively larger marks with progressively greater "on time" until the thick parts heat to produce marks of a second size on the recording medium, the plurality of marks made by the plurality of heads as the recording medium moves resulting in an image on the medium of grey scale values determined by the "on time".

12. Apparatus according to claim 11 wherein said supply means includes a voltage source, a clock and a plurality of switches connected between the voltage source and the plurality of heads with each switch having an open and closed condition, the clock operable to determine the "on time" for each of the heads by opening and closing the switches in a predetermined manner.

13. Apparatus according to claim 12 wherein the recording medium stops while the heads produce marks thereon and moves with respect to the heads when the switches are all in an open condition.

14. Apparatus according to claim 13 wherein the distance between the adjacent heads and the distance between stop of the recording medium are all chosen so that the whole surface of the recording medium under the heads is marked when all of the heads produce marks of the second size.

15. Apparatus according to claim 14 wherein the marks are substantially circular dots and the connections of the pairs of conductors to the resistor portions is remote enough from the narrow part that a dot of the second size does not overlap any conductor.

* * * * *